Dec. 21, 1965     RYUTARO MORI ET AL     3,224,286
VARIABLE SPEED-REDUCTION MECHANISM
Filed Oct. 9, 1963

United States Patent Office 3,224,286
Patented Dec. 21, 1965

3,224,286
VARIABLE SPEED-REDUCTION MECHANISM
Ryutaro Mori, Kodaira-shi, Masaharu Nishimura, Musashino-shi, and Kinichiro Furukawa, Nakano-ku, Tokyo-to, Japan, assignors to Kabushiki Kaisha Hitachi Seisakusho, Tokyo-to, Japan, a joint-stock company of Japan
Filed Oct. 9, 1963, Ser. No. 315,012
Claims priority, application Japan, Oct. 12, 1962, 37/44,129
6 Claims. (Cl. 74—199)

The present invention relates to improvements in a variable speed-reduction mechanism.

It is the principal object of the present invention to provide a novel and unique variable speed-reduction mechanism which is simple and compact and can produce an extremely high speed-reduction ratio by only one reduction step.

Further objects, advantages and features of the present invention will become apparent from the following description, taken in connection with the accompanying drawings, in which the same or equivalent parts are designated by the same reference characters, and in which.

Figure 1:
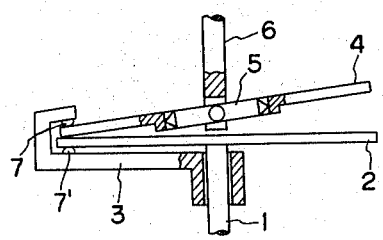
FIG. 1 is a side view, partly in section, showing a reduction mechanism according to this invention.

Referring to FIG. 1 showing, partly in section, a reduction mechanism embodying the unique feature of this invention, the mechanism comprises a driving shaft 1, a driving disc 2 fixed to an end of said shaft 1, an operation rod 3 supported rotatably by said shaft 1, a driven disc 4, a universal joint 5, and a following shaft 6. At the end of the operation rod 3 are provided mutually facing balls 7 and 7' which are being pressed by means of a pair of springs, and which in turn press together the discs 2 and 4 at portions near their peripheries, whereby said discs 2 and 4 are caused to undergo rolling in contact with each other without slipping between said balls. The driven disc 4 is tilted at an arbitrary angle to the shaft 6 and is connected with the shaft 6 by means of the universal joint 5 such as, for example, a gimbal mechanism so that the rotation of the disc 4 can be transmitted to the shaft 6.

Figure 2:
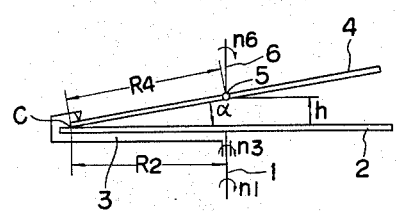
FIG. 2 is a schematic view for describing the embodiment shown in FIG. 1.

The operation of the embodiment of FIG. 1 will be explained hereinafter in connection with FIG. 2 which shows schematically the mechanism shown in FIG. 1. When the driving shaft 1 is caused to rotate at a rotational speed in terms of a number of revolutions $n_1$, the disc 2 rotates at the number of revolutions $n_1$ also. In this case, if the operation rod 3 is kept in a stationary state, the number of revolutions of the driven disc 4, i.e., the number of revolutions $n_6(n_3=0)$ of the following shaft 6 can be given by the following equations, where $R_2$ and $R_4$ represent, respectively, radii of the discs 2 and 4.

$$2\pi R_4 \cdot n_6(n_3=0) = 2\pi R_2 \cdot n_1 \qquad (1)$$

$$\therefore n_6(n_3=0) = \frac{R_2}{R_4} n_1 \qquad (2)$$

Next, the operation rod 3 is caused to rotate at a number of revolutions $n_3$ as the input revolution and the driving shaft 1 is kept in a stationary state. Then, the number of revolutions $n_6(n_1=0)$ of the following shaft 6 can be given by the following equations.

$$2\pi R_4 \cdot n_6(n_1=0) = 2\pi R_4 n_3 - 2\pi R_2 n_3 \qquad (3)$$

$$\therefore n_6(n_1=0) = \frac{R_4 - R_2}{R_4} n_3 \qquad (4)$$

Consequently, when the driving shaft 1 and the operation rod 3 are, simultaneously rotated, respectively, at a number of revolutions $n_1$ and at a number of revolutions $n_3$, the number of revolutions $n_6$ of the following shaft 6 can be given by the following equations.

$$n_6 = n_6(n_1=0) + n_6(n_3=0)$$
$$= n_1 (n_3-n_1) \frac{R_4 - R_2}{R_4} \qquad (5)$$

or $$n_6 = (n_1 - n_3) \frac{R_2}{R_4} + n_3 \qquad (6)$$

Thus, the number of revolutions $n_6$ can be changed arbitrarily by selecting appropriate combinations of the input revolutions $n_1$ and $n_3$. In this case, the number of revolutions $n_1$, $n_3$ and $n_6$ are designated as positive for right-handed revolutions as viewed from the output side.

If one of the input rotations corresponding to $n_1$ and $n_3$ is made to be an input rotation for driving and the other to be an input rotation for control, the mechanism can be used as a high reduction transmission mechanism capable of changing the reduction ratio in a stepless manner by changing the input rotation for control.

Equation 4 is also applicable to the case wherein the number of input revolutions $n_1$ of the shaft 1 becomes 0. Therefore, an extremely large reduction ratio $n_3/n_6$ can be obtained in one step by decreasing the difference between the values $R_2$ and $R_4$ which are radii of the disc 2 and 4 respectively at the locus of contact point between said discs. In the event that the contact point $c$ forms a circular locus as shown in FIGS. 1 and 2, a constant relationship which can be expressed by; $R_2=R_4 \cos \alpha$ exists in which $\alpha$ is the slope angle between the two discs 2 and 4, whereby a large reduction ratio can be obtained by selecting a small angle for $\alpha$. It will be more advantageous if the arrangement is so adapted that the slope angle $\alpha$ can be made variable arbitrarily within a possible range by adjustment of the distance $h$ between the centers of the discs 2 and 4. To attain the above object, for example, the shaft 1 and/or the shaft 6 can be made movable along the axial direction thereof.

Figure 3:
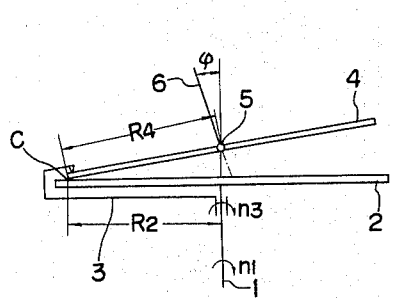
FIG. 3 is a schematic side view of another embodiment of the present invention.
Figure 4:
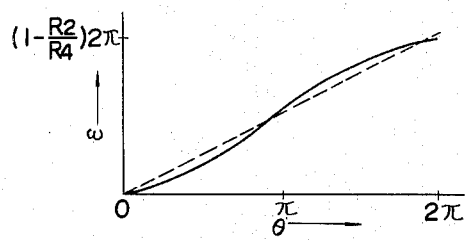
FIG. 4 is a diagram showing the relation between the rotational angles of the shafts 1 and 6 of the embodiment shown in FIG. 3.

It is also possible to construct the following shaft 6 in a tilted position relative to the driving shaft 1 as shown in FIG. 3, whereby exactly the same reducing action as that in the above case shown in FIG. 3 can be obtained, and furthermore, the shaft 1 and the operation rod 3 are caused to rotate at constant rotational velocities, thus causing the shaft 6 to rotate with variable rotational velocity. FIG. 4 shows a graph illustrating an example of this operation and indicating the relationship between the rotational angle ω (ordinate) of the shaft 6 and the rotational angle θ (abscissa) of the operation rod 3 in the case wherein, in the arrangement shown in FIG. 3, the number of revolutions $n_1$ of the shaft 1 is caused to be zero, and only the operation rod 3 is rotated at a constant rotational velocity as the input rotation. The case wherein both of the shafts 1 and 6 are on a straight line as shown in FIG. 2 is indicated by a dotted line.

In addition to said embodiment of this invention, there are many other kinds of possible variations thereof which will be explained hereinbelow.

Figure 5:
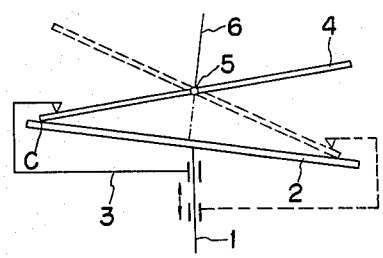
FIG. 5 is a schematic side view of a still another embodiment of the present invention.

A mechanism as shown in FIG. 5 comprises a disc 2 which is fixed to a shaft 1 in a tilted manner and an operation rod 3 which is adapted to cause a disc 4 to always rotate while being contacted by the disc 2. This can be accomplished, for example, either by the provision of thrust applying means adapted to push the bearing of the operating rod 3 always in downward direction, or by the provision of a spring mechanism at the part of the operating rod 3 which is to push the disc 4 downwardly. With such a mechanism, if the total lengths of the loci of the discs 2 and 4 at the contact point c are denoted by $L_2$ and $L_4$, respectively, then the following equation will be obtained.

$$n_6 = (n_3 - n_1)\frac{L_4 - L_2}{L_4} + n_1 \qquad (7)$$

Of course, if the locus of the contact point c in each of the discs 2 and 4 forms a circle, for example, when the input revolution $n_3$ is imparted to only the operating rod 3 with the condition $n_1 = 0$, then Equation 4 will be applicable.

Figure 6:
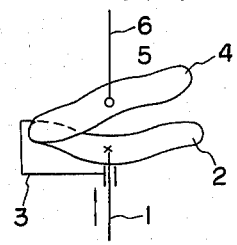
FIG. 6 is a schematic perspective view of a still other embodiment of the present invention.

The embodiment shown in FIG. 6 relates to the case in which the discs 2 and 4 are made into various corresponding shapes so that they may make three dimensional contact, instead of two dimensional contact between the discs 2 and 4 as shown in each of the embodiments described heretofore. Thus, the rotational velocity of the output revolution of the shaft 6 can be changed freely. Naturally, a universal joint 5 for the shaft 6 and disc 4, in such a case, is not necessarily on the extension of the shaft 1.

Figure 7:
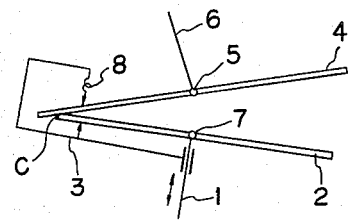
FIGS. 7 and 8 are schematic side views respectively of other embodiments of the present invention.

The embodiment shown in FIG. 7 relates to the case in which the shaft 1 and disc 2 are connected by means of a universal joint 7, and the discs 2 and 4 are adapted to be tilted freely with regard to their respective shafts 1 and 6. According to this embodiment, the locus of the contact point c can be changed arbitrarily either by securing the operation rod 3 onto an appropriate upper or lower portion of the shaft 1 or by slidingly rotating said operation rod at an appropriate period. However, a spring mechanism 8 is provided at the end portion of the operation rod 3, said end portion pressing the discs 2 and 4, in such a manner that even if the distance between the pressing portions of the discs 2 and 4 is changed, a constant pressure can be applied thereon at all times.

Figure 8:
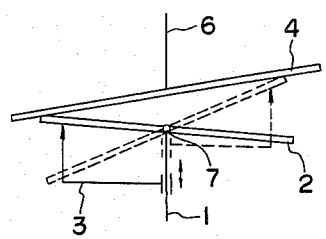

The embodiment shown in FIG. 8 relates to the case in which the shaft 6 and disc 4 are caused to be stationary, the shaft 1 and disc 2 are connected by means of a universal joint 7, and the operating rod 3 is pushed upward while sliding along the shaft 1 so that the disc 2 may be always pressed against the disc 4. This embodiment can be considered as a modification of the mechanism as illustrated in FIG. 5 with its input side and output side being interchanged. It is natural, therefore, that Equation 7 is applicable to this embodiment also.

Various kinds of modifications of the embodiment of this invention are possible in addition to those hereinbefore described. A mechanism in which the discs 2 and 4 are being pressed at the end portion of the operation rod 3 can be replaced by a combination of a magnet and a disc of magnetic material. Also, simultaneously with the slidable movement of the operating rod 3 relative to the shaft 1, the shaft itself can be made to move in the axial direction. In the case of movement of the shaft 1 in the axial direction, it is possible to vary $n_6$ even if the numbers of revolutions $n_1$ and $n_3$ are constant, and it is possible to obtain a stepless variable speed-reduction mechanism without changing $n_1$ or $n_3$.

As has been explained hereinabove by many examples of the embodiment of this invention, the reduction mechanism according to this invention is principally represented by the embodiment shown in FIG. 1 which is characterized by a construction comprising shafts 1 and 6, two rotating discs 2 and 4, at least one of which is connected to said shafts 1 and 6 by means of a universal joint, and an operation rod 3 which rotates while causing said rotating discs 2 and 4 to achieve rolling contact with each other. An input rotation can be imparted to either the shaft 1 or the operation rod 3, but in actual cases an input rotation is imparted to one of them, and a rotation for control is imparted to the other. Moreover, if necessary, the mechanism of this invention can be used in such a manner as to obtain an output rotation at the shaft 1 or the operation rod 3 by imparting an input rotation to the shaft 6. Since the reduction mechanism according to this invention makes it possible to obtain an extremely large reduction ratio in one step and, furthermore, to change such a reduction ratio in a stepless manner, stepless variable speed-reduction assemblies of smaller type can be realized, and further advantages such as ease of maintenance and inspection operations due to its simple mechanism can be obtained. While the invention has been explained by describing particular embodiments thereof, it will be apparent that improvements and modifications may be made therein without departing from the scope of the invention as defined in the appended claims.

What is claimed is:

1. A variable speed-reduction mechanism comprising: a first and a second rotary disc; a first and a second rotary shaft connected respectively to said first and second rotary discs, said connection between the first rotary disc and the first rotary shaft being achieved through a universal joint; and means adapted to press together said discs while causing said discs to achieve rolling contact with each other to enable the locus of the contact point between said discs to rotate around the first rotary shaft.

2. A variable speed-reduction mechanism comprising: a first and a second rotary disc; a first and a second rotary shaft connected respectively to said first and second rotary discs, said connection between the first rotary disc and the first rotary shaft being achieved through a universal joint; and means adapted to press together said discs while causing said discs to achieve rolling contact with each other to enable the locus of the contact point between said discs to rotate around the second rotary shaft.

3. A variable speed-reduction mechanism comprising: a first and a second rotary disc; a first and a second rotary shaft connected respectively to said first and second rotary discs, said connection between the second rotary disc and the second rotary shaft being achieved through a universal joint; and means adapted to press together said discs while causing said discs to achieve rolling contact with each other to enable the locus of the contact point between said discs to rotate around the first rotary shaft.

4. A variable speed-reduction mechanism comprising: a first and a second rotary disc; a first and a second rotary shaft connected respectively to said first and second rotary discs, said connection between the second rotary disc and the second rotary shaft being achieved through a universal joint; and means adapted to press together said discs while causing said discs to achieve rolling contact with each other to enable the locus of the contact point between said discs to rotate around the second rotary shaft.

5. A variable speed-reduction mechanism comprising: a first and a second rotary disc; a first and a second rotary shaft connected respectively to said first and second rotary discs, the connections between the first rotary disc and the first rotary shaft as well as between the second rotary disc and the second rotary shaft being respectively achieved through universal joints; and means adapted to press together said discs while causing said discs to achieve rolling contact with each other to enable the locus of the contact point between said discs to rotate around the first rotary shaft.

6. A variable speed-reduction mechanism comprising: a first and a second rotary disc; a first and a second rotary shaft connected respectively to said first and second rotary discs, the connections between the first rotary disc and the first rotary shaft as well as between the second rotary disc and the second rotary shaft being respectively achieved through universal joints; and means adapted to press together said discs while causing said discs to achieve rolling contact with each other to enable the locus of the contact point between said discs to rotate around the second rotary shaft.

References Cited by the Examiner
UNITED STATES PATENTS

| | | | |
|---|---|---|---|
| Re. 22,549 | 9/1844 | Plensler | 74—206 X |
| 1,232,937 | 7/1917 | Lawlor | 74—199 |

DON A. WAITE, *Primary Examiner.*